W. H. H. Young,
Band Cutter.
No. 110,324. Patented Dec. 20, 1870.
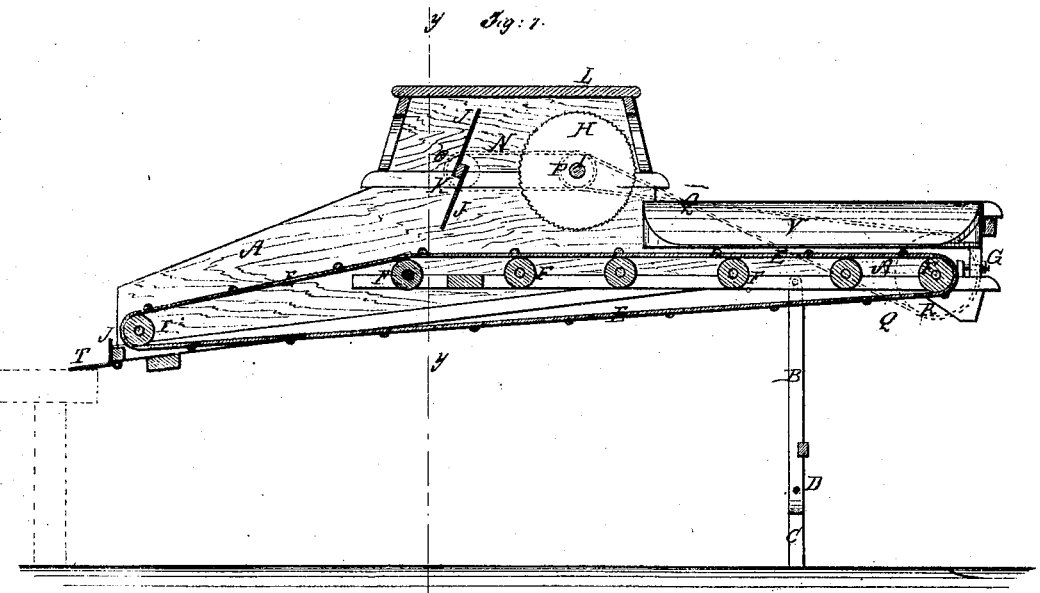
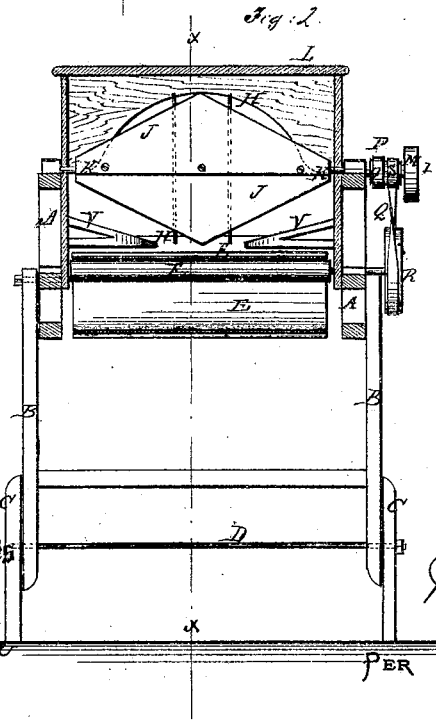

UNITED STATES PATENT OFFICE.

WILLIAM H. H. YOUNGS, OF WAVERLY, IOWA.

IMPROVEMENT IN AUTOMATIC BAND-CUTTERS, SPREADERS, AND FEEDERS.

Specification forming part of Letters Patent No. 110,324, dated December 20, 1870.

*To all whom it may concern:*

Be it known that I, WILLIAM H. H. YOUNGS, of Waverly, in the county of Bremer and State of Iowa, have invented a new and useful Improvement in Automatic Band-Cutter, Spreader, and Feeder; and I do hereby declare that the following is a full, clear, and exact description thereof, which will enable others skilled in the art to make and use the same, reference being had to the accompanying drawing, forming part of this specification, in which—

Figure 1 is a vertical longitudinal section of my improved machine, taken through the line *x x*, Fig. 2. Fig. 2 is a vertical cross-section of the same, taken through the line *y y*, Fig. 1.

Similar letters of reference indicate corresponding parts.

My invention has for its object to furnish an improved band-cutter and feeder for attachment to thrashing-machines, which shall be so constructed as to receive the bundles, cut the bands, spread the grain evenly, and deliver it to the thrashing-machine, thus saving labor and expense, and doing the work better than it could be done by hand; and it consists in the construction and combination of the various parts of the machine, as hereinafter more fully described.

A is the frame-work of the machine, the forward end of which is designed to be secured to the rear end of the thrasher by hooks or other convenient and substantial means.

The rear part of the machine is supported by legs B, the upper ends of which are pivoted to the rear part of the frame A, and the lower parts of which are connected and held in their proper relative position by a cross-bar, as shown in Figs. 1 and 2.

To the lower parts of the legs B are attached extension-pieces C, which are connected to each other and secured to the said legs B by a long bolt, D, which passes through holes in the lower ends of the said legs B, and through slots in the said extension-pieces C, so that the supports B C D may be conveniently adjusted, as the circumstances of the case may require.

E is an endless belt or carrier, which is provided with cross-slats, and which passes around rollers F, pivoted to the frame A, and so arranged that the rear part of the carrier may be horizontal, or nearly so, and the forward part inclined downward, as shown in Fig. 1.

The journal-boxes of the rear roller, F, are movable, so that they may be slid forward or back by the swiveled screws G, to adjust the tautness of the belt, as may be required.

H are circular cutters, one, two, or more of which may be used, and which are made with sickle-teeth or cutting-edges, as shown in Fig. 1. The cutters H are attached to a shaft, I, which revolves in bearings attached to the frame A.

J are the spreaders, which are angular plates, as shown in Fig. 2, and which are attached to the shaft K. The spreaders J should be attached to the shaft K by bolts passing through slots in the said spreaders, so that the spreaders may be conveniently raised and lowered as the size of the bundles may require.

The cutters H and spreaders J should be covered with a detachable cap, L, to prevent any person or thing from coming in contact with and being injured by or injuring the said cutters and spreaders.

The cutter-shaft I is driven from the thrashing-cylinder by a belt that passes around a pulley, M, attached to the said shaft I.

The spreader-shaft K is driven from the cutter-shaft I by a belt, N, that passes around a pulley, O, attached to said spreader-shaft, and around a pulley, P, attached to said cutter-shaft.

The endless belt, apron, or carrier E is driven from the cutter-shaft I by a belt, Q, that passes around a pulley, R, attached to the journal of the rear roller, F, and around a pulley, S, attached to said cutter-shaft.

To the forward end of the frame A is hinged or pivoted an apron or plate, T, designed to overlap the concave of the thrasher, and guide the grain from the carrier E to said thrasher.

The rear edge of the guide-plate T is provided with a rubber flange or cut-off, U, projecting nearly to the carrier-belt E, to prevent any grain from being carried back by said carrier-belt.

V are inclined side boards, attached to the rear upper part of the frame A, to guide the bundle into such a position upon the carrier-belt E as to be operated upon properly by the cutters and spreaders.

Having thus described my invention, I claim as new and desire to secure by Letters Patent—

An improved automatic band-cutter, spreader, and feeder for thrashing-machines, consisting of the frame A, adjustable support B C D, endless-belt carrier E, rollers F, adjusting-screws G, circular sickle-toothed cutters H, shaft I, angular spreaders J, shaft K, cap L, guide T U, and inclined side boards, V, said parts being constructed, arranged, and operating substantially as herein shown and described, and for the purposes set forth.

WM. H. H. YOUNGS.

Witnesses:
H. S. HOOVER,
C. C. HOOVER.